US011488774B2

(12) United States Patent
Amba et al.

(10) Patent No.: US 11,488,774 B2
(45) Date of Patent: Nov. 1, 2022

(54) SYSTEMS AND METHODS FOR FORMING MAGNET WIRE INSULATION

(71) Applicant: Essex Group, Inc., Fort Wayne, IN (US)

(72) Inventors: Rakshit Amba, Hyderabad (IN); Matthew Leach, Fort Wayne, IN (US); M. Mazhar Said, Arlington Heights, IL (US)

(73) Assignee: ESSEX FURUKAWA MAGNET WIRE USA LLC, Atlanta, GA (US)

( * ) Notice: Subject to any disclaimer, the term of this patent is extended or adjusted under 35 U.S.C. 154(b) by 475 days.

(21) Appl. No.: 16/629,745

(22) PCT Filed: Jul. 13, 2018

(86) PCT No.: PCT/US2018/041936
§ 371 (c)(1),
(2) Date: Jan. 9, 2020

(87) PCT Pub. No.: WO2019/018214
PCT Pub. Date: Jan. 24, 2019

(65) Prior Publication Data
US 2020/0143987 A1    May 7, 2020

Related U.S. Application Data

(60) Provisional application No. 62/534,265, filed on Jul. 19, 2017.

(51) Int. Cl.
| H01F 41/12 | (2006.01) |
| B29C 48/00 | (2019.01) |
| B29C 48/21 | (2019.01) |
| B29C 48/34 | (2019.01) |
| B29C 48/92 | (2019.01) |

(Continued)

(52) U.S. Cl.
CPC .......... *H01F 41/12* (2013.01); *B29C 48/022* (2019.02); *B29C 48/154* (2019.02); *B29C 48/21* (2019.02); *B29C 48/34* (2019.02); *B29C 48/92* (2019.02); *H01B 3/303* (2013.01); *H01B 13/143* (2013.01); *H01B 13/145* (2013.01); *H01B 13/146* (2013.01); *H01B 13/147* (2013.01); *H01B 13/148* (2013.01); *H01F 5/06* (2013.01); *B29K 2101/10* (2013.01); *B29K 2995/0007* (2013.01);
(Continued)

(58) Field of Classification Search
None
See application file for complete search history.

(56) References Cited

U.S. PATENT DOCUMENTS

2006/0289189 A1* 12/2006 Aisenbrey .............. B29C 48/91
    174/36
2016/0304695 A1    10/2016 Lyons
2018/0127897 A1    5/2018 Song

OTHER PUBLICATIONS

Office Action dated Mar. 16, 2022 for U.S. Appl. No. 16/629,755.

* cited by examiner

*Primary Examiner* — Robert J Grun

(57) ABSTRACT

Systems and methods for forming insulation on magnet wire are provided. An extruder that includes one or more rotating screws may receive a plurality of ingredients for a polymeric insulation material and process the plurality of ingredients to facilitate polymerization of the polymeric insulation material within the extruder. An application assembly in fluid communication with the extruder may apply the polymeric insulation material onto a wire. A curing device may then cure the polymeric insulation material.

15 Claims, 4 Drawing Sheets

(51) Int. Cl.
- H01B 13/14 (2006.01)
- B29C 48/154 (2019.01)
- H01B 3/30 (2006.01)
- H01F 5/06 (2006.01)
- B29K 101/10 (2006.01)
- H02K 3/32 (2006.01)
- H02K 15/10 (2006.01)

(52) U.S. Cl.
CPC ........ *B29K 2995/0008* (2013.01); *H02K 3/32* (2013.01); *H02K 15/105* (2013.01)

SYSTEMS AND METHODS FOR FORMING MAGNET WIRE INSULATION

CROSS-REFERENCE TO RELATED APPLICATION

This application is a 371 of PCT/US2018/041936, filed on Jul. 13, 2018 and entitled "Systems and Methods for Forming Magnet Wire Insulation," which claims priority to U.S. Provisional Application No. 62/534,265, filed Jul. 19, 2017 and entitled "Systems and Methods for Forming Extruded Magnet Wire Insulation. The contents of each application is incorporated by reference herein in its entirety.

TECHNICAL FIELD

Embodiments of the disclosure relate generally to insulated magnet wire and, more particularly, to systems and methods for forming magnet wire with one or more polymeric insulation layers.

BACKGROUND

Magnetic winding wire, also referred to as magnet wire or winding wire, is used in a multitude of devices that require the development of electrical and/or magnetic fields to perform electromechanical work. Examples of such devices include electric motors, generators, transformers, actuator coils, etc. Typically, magnet wire is constructed by applying electrical insulation to a metallic conductor, such as a copper, aluminum, or alloy conductor. The electrical insulation is typically formed as a coating that provides for electrical integrity and prevents shorts in the magnet wire.

In many cases, conventional insulation is formed from a combination of polymeric enamel films. Enamel layer are typically applied as a varnish that is cured in an enameling oven, and a plurality of layers are successively formed on one another until a desired enamel thickness or build is attained. In addition to or as an alternative to enamel, extruded polymers have been used to form magnet wire insulation. Typically, pellets of pre-formulated or pre-compounded polymeric material are melted and provided to an extrusion device and utilized to form insulation.

Regardless of whether enamel or extruded insulation is utilized, conventional systems require the polymeric insulation material to be chemically compounded or formulated from pre-polymers, monomers, reactants, and other ingredients. In many cases, a polymeric material is formed in a relatively large chemical reactor or vessel remote from a magnet wire formation and/or insulation line. For enamel insulation, preformed polymeric materials are suspended into a solvent solution and provided to a wire line for application. For extruded insulation, preformed polymeric materials are provided as pellets that are subsequently melted and extruded as insulation. These distributed processes for formulating and applying polymeric insulation are energy intensive and increase overall cost. Accordingly, an opportunity exists for improved systems and methods for forming magnet wire insulation in which polymers can be formed or produced in conjunction with application.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Various embodiments of the present disclosure are directed to systems and methods for forming insulation on winding wires, magnetic winding wires, or magnet wires (hereinafter referred to as "magnet wire"). In certain embodiments, a polymeric insulation material may be formulated, compounded, and/or polymerized in tandem with application of the insulation material onto magnet wire. For example, one or more monomers, pre-polymers, reactants, raw materials, and/or other ingredients may be optionally stirred, mixed, or otherwise blended, and then provided to an extruder, such as a single screw or a multi-screw extruder. The extruder may perform additional mixing of the ingredients and may increase the pressure and/or temperature of the ingredients, thereby facilitating one or more polymerization and/or other reactions. In other words, one or more chemical reactions that result in the formation of a polymeric material from the ingredients may occur within the extruder.

As desired, ingredients for a polymeric insulation material may be added to an extruder at a wide variety of suitable locations along the extruder. For example, various portions of the ingredients may be added to the extruder at a different locations corresponding to different steps or portions of a polymerization or other chemical process. In certain embodiments, a first portion of ingredients may be provided to the extruder at a first location, and a second portion of ingredients may be provided to the extruder at a second location downstream from the first location. As another example, filler materials and/or other ingredients may be added to an extruder subsequent to a polymerization process. The final polymeric insulation material may then be provided to one or more application assemblies, such as an extrusion crosshead, for application onto one or more magnet wires.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
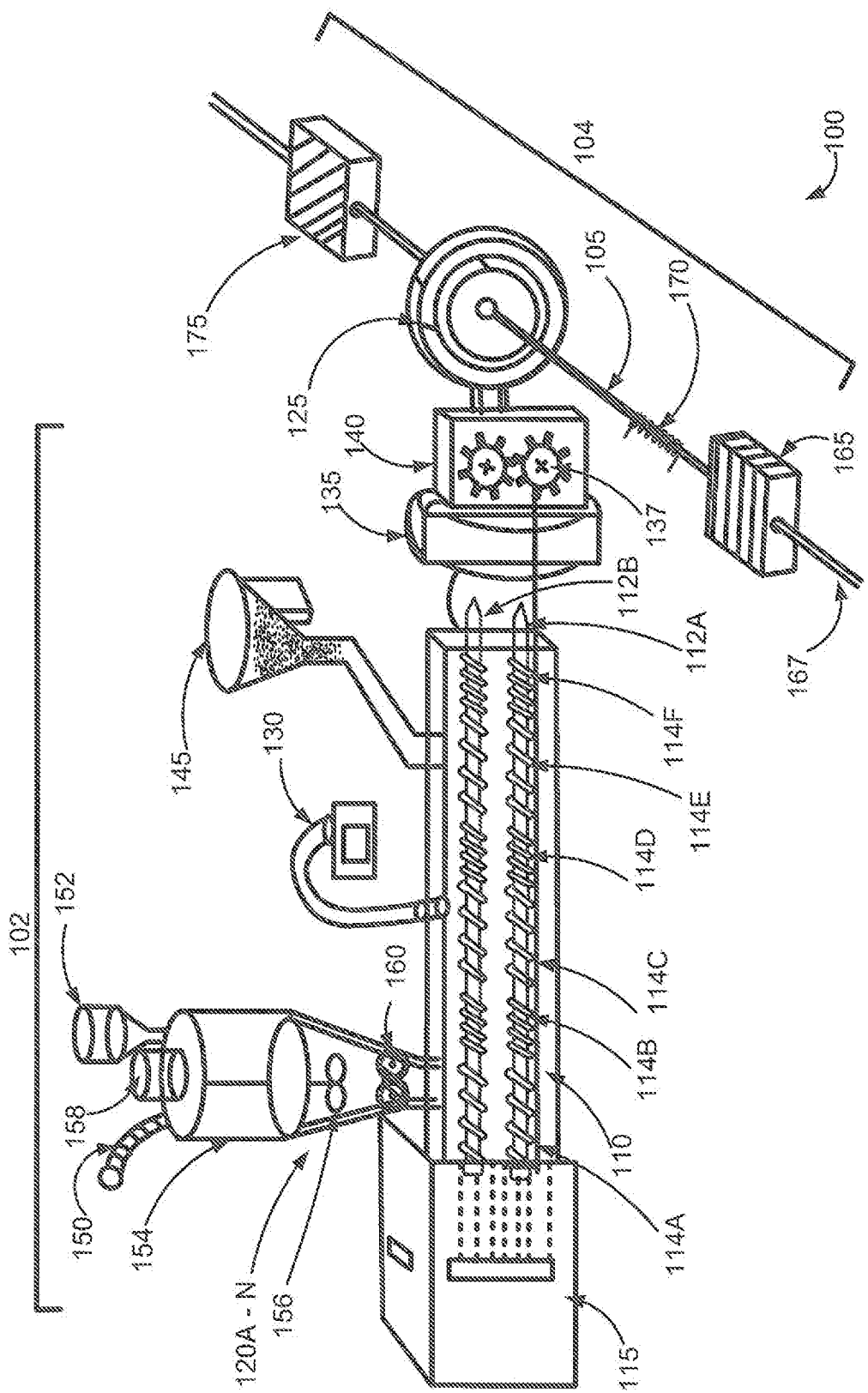
FIGS. 1 and 2 depict schematic diagrams of example systems that may be utilized to formulate and apply polymeric insulation material onto magnet wire in a tandem or inline manner, according to illustrative embodiments of the disclosure.

FIG. 1 illustrates a schematic view of an example system 100 that may be utilized to formulate and apply one or more suitable polymeric insulation materials onto a wire 105, such as a magnet wire. According to an aspect of the disclosure, the system 100 may include one or more components or subsystems that facilitate the polymerization, formulation, and/or other formation of one or more polymeric materials to be extruded. In other words, the system 100 may include a polymerization system 102. The formulated polymeric material may then be applied onto the wire 105 in a continuous or inline manner. In other words, the polymerization system 102 may operate in tandem with a wire line 104 to facilitate inline polymerization of insulation material and application of the insulation material onto the wire 105.

With reference to FIG. 1, the polymerization system 102 may include a suitable extruder 110 that is powered by one or more suitable motor assemblies 115. The extruder 110 may receive a plurality of ingredients for a polymeric insulation material, such as one or more monomers, prepolymers, raw materials, and/or reactants, from one or more suitable feeder assemblies 120A-N, and the plurality of ingredients may be processed by the extruder 110 in order to form the polymeric insulation material within the extruder 110. The insulation material may then be provided to one or more suitable application assemblies for application onto the wire 105, such as one or more extrusion crossheads 125 configured to extrude the insulation material. Processing of the ingredients in the extruder 110 may facilitate polymerization, one or more chemical reactions, and/or other formulation of a polymeric insulation material from the plurality of ingredients. As desired, one or more vacuum devolatilization devices 130, filtering devices 135, gear pumps 137, melt pumps 140, and/or other suitable devices may be utilized to further process the polymeric insulation material prior to application. Additionally, any number of suitable downstream feeder assemblies 145 may be utilized to add additional components to the polymeric material. Each of these components is described in greater detail below.

The extruder 110 may be any suitable device configured to receive a plurality of ingredients for a polymeric insulation material and induce polymerization and/or other physicochemical transformations of the ingredients in order to form the insulation material. In certain embodiments, the extruder 110 may be a single screw, twin screw, or other multi-screw extruder. In the event that the extruder 110 is a multi-screw extruder, any number of suitable screws may be utilized. In operation, ingredients may be mixed as they pass through the extruder 110. Additionally, the extruder 110 may increase or build pressure in the ingredients to facilitate polymerization and/or chemical reactions. The increased pressure may also result in increasing the temperature of the ingredients and/or a polymer melt formed from the ingredients, thereby resulting in the formation of a polymeric material that may be extruded or otherwise applied onto the wire 105.

In conventional wire production processes, polymeric materials are typically produced in an offline manner through a series of chemical reactions. For example, polymers may be produced in relatively large reactors. The polymers are then compounded with functional additives and extruded as pellets, provided as powders, or otherwise provided for subsequent application. The pellets, powders, or other substances (e.g., varnishes containing powders blended with solvents, etc.) are then shipped or transferred to a wire production facility and provided to application equipment. For example, pellets may be provided to extrusion equipment. As another example, varnishes containing thermoset polymers may be provided to application dies. By contrast, the present disclosure describes a system 100 that facilitates both the formulation of a polymeric material and the application of the polymeric material as wire insulation in a tandem or inline process. Additionally, the system 100 may facilitate the formulation of a polymeric material in a continuous process in a relatively smaller area than conventional offline processes.

As shown in FIG. 1, the extruder 110 may be a twin screw extruder that includes two intermeshed screws 112A, 112B that may each be rotated. However, the extruder 110 may include any number of screws. Each screw 112A, 112B may include a shaft with any number of threads or ridges extending from or formed on the shaft. In certain embodiments, the spacings or pitch between different portions of a thread or between different threads may be varied within a screw (generally referred to as screw 112) to facilitate desired reactions and/or functionality within the extruder 110. For example, certain sections of a screw 112 may include relatively larger or deeper thread spacings or a wider screw pitch, for example, to facilitate the addition of materials to the extruder 110 and/or to facilitate the vacuuming or other removal of volatile and/or unwanted substances. Other sections of a screw 112 may include narrower thread spacings or a narrower screw pitch to facilitate ingredient melting, mixing, kneading, and/or pressurization.

With reference to FIG. 1, a first section 114A of a screw 112 may have larger or deeper thread spacings to facilitate receipt of materials from a feeder assembly 120. Similarly, if multiple feeder assemblies are utilized, corresponding sections of the screw may have larger or deeper spacings. A second section 114B of the screw 112 may have narrow thread spacings to facilitate ingredient melting, pressurization, and/or onset of polymerization of ingredients received from the feeder assembly 120. As desired, thread spacings may be made progressively smaller or more narrow in order to gradually increase pressure and temperature and/or to force mixing and/or polymerization. A third section 114C of the screw 112 may have larger spacings to facilitate vacuum devolatilization as described in greater detail below. A fourth section 114D of the screw 112 may then have smaller spacings to reheat or pressurize the mixture within the extruder 110. A fifth optional section 114E of the screw 112 may have wider spacings to facilitate the addition of additives and/or other ingredients, and a sixth section 114F may then have smaller spacings to reheat, pressurize, and/or further mix the materials in the extruder. Indeed, a wide variety of suitable thread designs and/or combinations of thread designs may be utilized as desired in various embodiments, and those discussed above are provided by way of non-limiting example only.

A wide variety of different types of screw designs and/or combinations of screws may be incorporated into the extruder 110 as desired in various embodiments. Various screws may be utilized to achieve a wide variety of different types of ingredient mixing within the extruder 110. For example, in certain embodiments, one or more screws may be utilized to facilitate dispersive mixing of various ingredients. In other embodiments, one or more screws may be utilized to facilitate distributive mixing of various ingredients. As another example, one or more screw designs may be selected to facilitate or assist in devolatilization of a polymeric material and/or any number of ingredients.

One or more suitable motor assemblies 115 may drive the extruder 110. For example, the one or more motor assemblies 115 may turn and/or maintain torque on the screws 112A, 112B within the extruder 110. A motor assembly 115 may include any number of suitable motors, rotating electric machines, and/or other devices configured to produce mechanical energy. In certain embodiments, a motor assembly 115 may be configured to provide energy to a suitable gearbox assembly that turns and/or maintains torque on the screws 112A, 112B. As desired in various embodiments, any suitable number of motors and/or any suitable gearbox assembly may be incorporated into a motor assembly 115. Additionally, a motor assembly 115 may be controlled via any number of suitable control devices, such as one or more processor-driven devices and/or computing devices. In certain embodiments, the output of a motor assembly 15 may be adjusted in order to provide desired torque on the screws 112A, 112B. The desired torque may be based upon a wide variety of suitable factors, such as the number of screws included in an extruder 110, the types of ingredients processed by the extruder 110, a type of polymeric material formulated or polymerized in the extruder 110, the operating speed or line speed of the wire line 104, etc.

A wide variety of suitable polymeric insulation materials may be formed within the extruder 110 as desired in various embodiments. In certain embodiments, a thermoplastic polymeric material may be formed within the extruder 110. Typically, a thermoplastic polymer will become pliable or moldable above a specific temperature (e.g., a melting temperature, etc.) and then solidify upon cooling. Examples of suitable thermoplastic polymeric materials include, but are not limited to, polyether-ether-ketone ("PEEK"), polyaryletherketone ("PAEK"), polyetheretherketoneketone ("PEEKK"), polyetherketoneketone ("PEKK"), polyetherketone ("PEK"), polyetherketoneketoneetherketone ("PEKKEK"), polyketone ("PK"), any other suitable material that includes at least one ketone group, thermoplastic polyimide ("PI"), aromatic polyamide, aromatic polyester, polyphenylene sulfide ("PPS"), polysulfone ("PSU"), polyphenylsulfone ("PPSU"), polyethersulfone ("PESU"), materials that combine one or more fluoropolymers with base materials, fluoroethylene, siloxane group polymers, etc.

In other embodiments, a thermoset polymeric material may be formed within the extruder 110. Typically, a thermoset or thermosetting polymer is a material that may be irreversibly cured from a soft solid or viscous liquid (e.g., a powder, a paste that includes solvents, etc.) to an insoluble or cross-linked resin. Thermoset polymers typically cannot be melted for extruding as the melting process will break down or degrade the polymers. However, in certain embodiments, a thermoset polymer that includes both polymeric material and solvent may be synthesized, formed, or polymerized within the extruder. The solution may then be provided to a suitable application device. For example, a paste, slurry, or low solvent material including the polymeric material may be press or paste extruded onto a magnet wire 105. As another example, a varnish containing the polymeric material dissolved in solvent may be provided to a suitable die or other application assembly for application onto a magnet wire 105. Examples of suitable thermoset polymers that may be formed within the extruder 110 include, but are not limited to, polyvinyl acetal-phenolic, polyimide ("PI"), polyamideimide ("PAI"), amideimide, polyester, polyesterimide, polysulfone, polyphenylenesulfone, polysulfide, polyphenylenesulfide, polyetherimide, polyamide, theic polyester, etc.

In yet other embodiments, as explained in greater detail below with reference to FIG. 3, a blend or composite of two or more polymeric materials may be formed. For example, a plurality of separate extruders may be utilized to formulate two or more polymeric materials that will be blended, mixed, or otherwise combined together to form magnet wire insulation. As another example, a first polymeric material may be blended in an extruder 110 while a second polymeric material to be blended with the first material is formed in an offline process and subsequently provided for blending or mixing. As desired, multiple separate polymeric materials may either be blended or otherwise within one of the extruders (e.g., extruder 110, etc.) or within another suitable component or device (e.g., a mixing tank, etc.) prior to the overall material being provided to an application assembly (e.g., an extrusion crosshead 125, etc.). As desired, any number of compatibilizers and/or cross-linking agents may be added to a blend or combination of polymeric materials.

Any suitable polymeric blends, composites, and/or other combinations may be formulated and/or utilized as desired in various embodiments of the disclosure, such as combinations of any of the polymeric materials discussed above. Additionally, any suitable blending rates, mixing rates, or blending ratios may be utilized when two or more polymeric materials are combined together. Regardless of the polymeric material or blend of polymeric material utilized, in certain embodiments, one or more polymers may be selected and/or polymerized based at least in part upon a desired application for a magnet wire. For example, an induction motor suitable for use in an electric vehicle may require a polymeric material having a relatively low dielectric constant and a relatively high partial discharge inception voltage ("PDIV").

With continued reference to FIG. 1, a wide variety of suitable ingredients or raw materials may be provided to the extruder 110 via one or more suitable feeder assemblies 120A-N. The ingredients provided by one or more feeder assemblies 120A-N may be based at least in part upon a polymeric material to be formulated within the extruder and provided to one or more application assemblies. Ingredients and/or raw materials for a polymeric insulation material may include, for example, one or more monomers, pre-polymers, reactants, powders, solvents, and/or other suitable materials. Additionally, various ingredients may be provided in any suitable forms and/or phases, such as solids and/or liquids.

Any number of feeder assemblies 120A-N may be utilized as desired to provide ingredients and/or raw materials to the extruder 110. In the event that a plurality of feeder assemblies 120 is utilized, the various feeder assemblies 120A-N may be positioned at any suitable location or combination of locations along the extruder 110. For example, a plurality of feeder assemblies 120A-N may provide material to the extruder 110 at a plurality of longitudinally spaced locations. For example, a first feeder assembly 120A may provide material to the extruder 110 at a first location along a longitudinal length of the extruder 110, and a second feeder assembly 120B may provide material to the extruder 110 at a second location along the longitudinal length of the extruder 110 that is offset downstream from the first location. In this regard, ingredients may be provided at desired locations that correspond to respective stages or phases of a polymerization or other formulation process. Additionally, as desired, any number of feeder assemblies 120A-N may be positioned at any given location along a longitudinal length of the extruder 110. For example, one or multiple feeder assemblies may provide respective ingredients to the extruder 110 at a given location within the operating area of the extruder 110.

Figure 2:
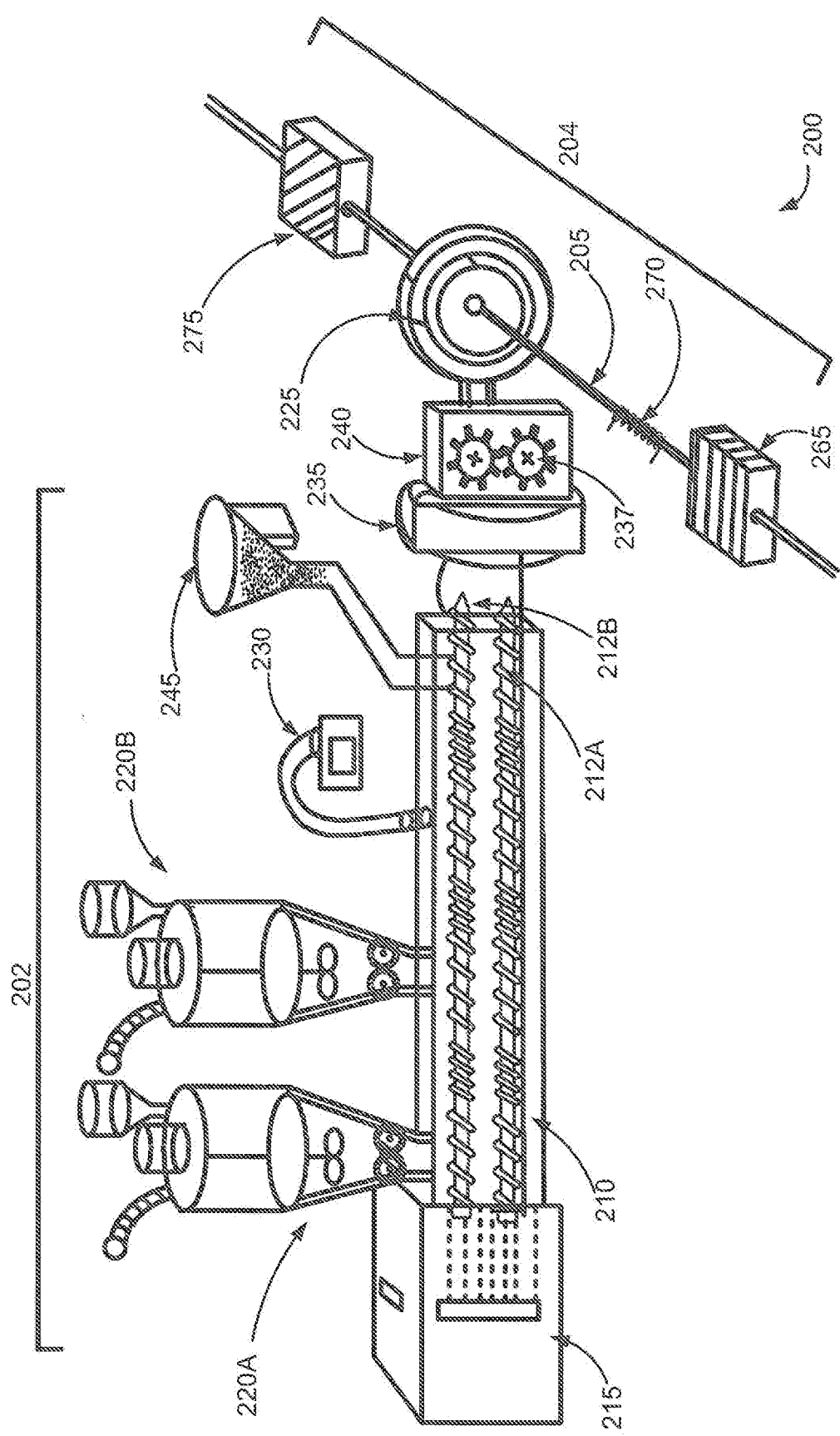

A single feeder assembly (generally referred to as feeder assembly 120) is illustrated in FIG. 1; however, additional feeder assemblies may be provided. For example, FIG. 2 illustrates an example system 200 that includes a plurality of longitudinally spaced feeder assemblies. A feeder assembly 120 may include any number of suitable components configured to provide one or more ingredients to the extruder 110. In certain embodiments, a feeder assembly 120 may additionally include one or more components that are configured to mix, blend, or otherwise combine two or more ingredients prior to the mixture being provided to the extruder 110. As shown, a feeder assembly 120 may include one or more hoppers 150, 152 and/or similar components configured to supply ingredients or raw materials to a stirring or mixing tank 154. Any number of hoppers may be utilized as desired in conjunction with a feeder assembly 120, and each hopper may be configured to supply any suitable materials and/or combinations of materials. For example, a powder hopper 150 may be configured to provide solid raw materials in a powder form. As another example, a pre-polymer hopper 152 may be configured to provide one or more monomers and/or pre-polymers in liquid or any other suitable form. A wide variety of suitable types of hoppers may be utilized as desired, such as bottom hoppers, live hoppers, tilt hoppers, etc. Additionally, a hopper may utilize any suitable type of feeding mechanism. In certain embodiments, one or more hoppers may utilize a loss-in-weight feeding mechanism that facilitates precise supply of material to the stirring tank 154.

The stirring tank 154 or mixing tank may receive materials from the hoppers 150, 152 and mix or stir the materials together prior to the mixture being supplied to the extruder 110. In certain embodiments, one or more reactions between the raw materials may occur within the stirring tank 154. The stirring tank 154 may include any number of suitable agitators 156 or other components that facilitate stirring or mixing of the raw materials. The agitator(s) 156 may be powered or driven by one or more suitable motors 158. Once materials are mixed in the stirring tank 154, one or more suitable gear pumps 160 may pump, feed, or otherwise supply the mixture to the extruder 110. Although a single stirring tank 154 is illustrated in FIG. 1, in other embodiments, a plurality of stirring tanks may be incorporated into a feeder assembly 120. As an alternative to incorporating one or more stirring tanks 154 into a feeder assembly 120, one or more hoppers may be configured to supply material directly to the extruder 110.

As set forth above, the extruder 110 may process received ingredients and/or materials in order to facilitate completion of a polymerization process, one or more chemical reactions, and/or formation of a polymeric insulation material. Materials or ingredients may be supplied to the extruder 110 at any suitable location or combination of locations along a longitudinally or processing length of the extruder 110. As set forth above, a screw pitch within the extruder 110 may be widened and/or otherwise varied as desired to accommodate feeding of materials and/or ingredients. Once fed into the extruder 110, materials may be forced through a kneading block or portion of the extruder 110 with a relatively narrow screw pitch to facilitate mixing and/or formation of a homogenous material.

Additionally, in certain embodiments, one or more components or devices may be configured to remove unwanted materials from the extruder 110 and/or the polymeric material formulated within the extruder 110. For example, one or more vacuum devolatilization device(s) 130 may be configured to vacuum out solvents, moisture, and/or other unwanted substances. Any number of vacuum devolatilization devices 130 may be utilized as desired, and each device 130 may be positioned at any suitable location along the extruder 110. In certain embodiments, a portion of one or more screws 112A, 112B positioned proximate to a vacuum devolatilization device 130, such as the threads in the third section 114C of the screws 112A, 112B, may have a wider screw pitch to facilitate removal of unwanted substances. The screw pitch(es) may then be narrowed subsequent to vacuum devolatilization, for example, to form a kneading block that assists in mixing, enhancing homogeneity, heating, and/or pressurizing material within the extruder 110.

In certain embodiments, one or more downstream raw material feeder(s) 145 may provide materials to the extruder 110 downstream of the one or more feeder assemblies 120A-N. For example, a downstream raw material feeder 145 may be configured to supply one or more insulation filler materials (e.g., inorganic materials such as metals, transition metals, lanthanides, actinides, metal oxides, and/or hydrated oxides of suitable materials such as aluminum, tin, boron, germanium, gallium, lead, silicon, titanium, chromium, zinc, yttrium, vanadium, zirconium, nickel, glass fibers, etc.; suitable organic materials such as polyaniline, polyacetylene, polyphenylene, polypyrrole, other electrically conductive particles; any suitable combination of materials, etc.), one or more nanoparticles, one or more materials that will not melt during extrusion or other application of an insulation material (e.g., raw materials with a melting point that exceeds an extrusion processing temperature, etc.), one or more materials or ingredients to be added subsequent to devolatilization, and/or one or more materials to be added at a downstream point in a polymerization process. Any suitable materials and/or combinations of materials may be provided by one or more downstream raw material feeders 145.

A downstream raw material feeder 145 may be positioned at any suitable location along the extruder 110. For example, a downstream raw material feeder 145 may be positioned at any suitable longitudinal location. In certain embodiments, a downstream raw material feeder 145 may feed material into the top of the extruder 110 or into a side of the extruder 110. Additionally, a downstream raw material feeder 145 may include any suitable components. As shown, a downstream raw material feeder 145 may include one or more hoppers similar to those described above for the feeder assembly 120. In other embodiments, a downstream raw material feeder 145 may include one or more suitable stirring or mixing tanks, gear pumps, and/or a wide variety of other suitable components. Additionally, in certain embodiments, one or more screw pitches within the extruder 110 (e.g., section 114E, etc.) may be widened in order to receive material, and a subsequent kneading block or portion (e.g., section 114F, etc.) may include a more narrow screw pitch following the receipt of material.

In certain embodiments, a downstream raw material feeder 145 may have or include a feed component having a single, twin, or other multi-screw design in order to facilitate material feeding into the extruder 110. At the same time, the raw material feeder 145 may reduce or avoid pressurized polymer leakage out of the extruder 110. During operation, the feeder 145 may apply force to the supply of raw material introduced into the extruder 110. In this regard, leakage of a pressurized and/or relatively low viscous polymer material may be reduced. In other embodiments, a downstream raw material feeder 145, such as a side feeder, may operate as a vacuum port with precisely designed gaps or spaces that are small enough (e.g., under 0.05 inches, etc.) to allow vacuum suction of volatile material firm the polymer being formulated within the extruder 110. In this regard, the raw material feeder 145 may also be used as a vacuum port for polymers.

For example, if a side feeder is positioned at a location where the polymeric material within the extruder 110 has a relatively high viscosity, then leakage of the polymeric material may be less likely. Accordingly, a side feeder or other raw material feeder 145 may be utilized to draw or vacuum out solvents, liquids, and/or other volatile or unwanted material. Use of a multi-screw side feeder may facilitate self-wiping of a polymer sticking to a side feeder screw while also applying force to introduce raw materials and/or recirculate the polymer back into the extruder 110.

During typical processing of an insulation material within the extruder 110, a majority of the heat (e.g., approximately 80%, etc.) imparted on the insulation material may be provided by the screw(s) 112A, 112B torque increasing pressure. As desired, a wide variety of other temperature control devices may be incorporated into the extruder 110 and/or utilized in conjunction with the extruder 110. For example, one or more heating devices (e.g., heating coils, induction heating devices, etc.) may be positioned within the extruder 110 and/or adjacent to a body or outer shell of the extruder 110 in order to provide additional heating. As another example, any number of channels suitable for carrying a temperature control fluid may be formed within the extruder 110 (e.g., adjacent to the screw(s) 112A, 112B, etc.). These channels may be configured to carry or circulate any suitable fluids (e.g., water, oil, refrigerants, air, etc.) that may be utilized to heat, cool, and/or otherwise control the temperature at any desired locations within the extruder 110. For example, desired temperatures may be maintained and/or otherwise controlled within the extruder 110 in order to enhance or trigger desired chemical reactions. Once a fluid is circulated through the extruder 110 in one or more channels, the fluid may be provided to any suitable devices (e.g., heaters, cooling baths, compressors, etc.) external to or outside of the extruder 110 in order to adjust the temperature of the fluid prior to recirculation within the extruder 110. Additionally, any suitable control devices and/or sensors (e.g., temperature sensors, etc.) may be utilized in conjunction with the one or more channels and/or external devices to maintain desired temperatures.

Once an insulation material has been formulated, polymerized, and/or otherwise processed by the extruder 110, the insulation material may be provided to one or more suitable application assemblies, such as one or more extrusion crossheads 125, for application onto one or more wires 105. In certain embodiments, the insulation material may be passed through one or more suitable filtering device(s) 135 prior to application. The filtering may remove unwanted materials and/or materials that are larger than a desired size. These larger materials may result in beading and/or other undesired conditions within an insulated magnet wire. In one example embodiment, a sliding or continuous screen changer may be provided as a filtering device 135. The continuous screen changer may include at least one revolving disk that rotates at a desired velocity, such as approximately one inch per hour. Additionally, one or more mesh or screen filters may be incorporated into or attached to the disk. As insulation material passes through the filter(s), unwanted materials may be filtered out. Rotation of the disk may then permit the filter(s) to be cleaned as sections of the filter(s) rotate outside of an insulation material flow path. A wide variety of other suitable filtering devices and/or combinations of filtering devices may be utilized as desired in other embodiments.

Any number of suitable pumps may facilitate provision of insulation material from the extruder 110 to one or more application assemblies in fluid communication with the extruder 110, such as the extrusion crosshead(s) 125. For example, one or more suitable gear pumps 137 may be provided. A gear pump 137 may provide a wide variety of benefits in various embodiments, for example, increasing the pressure of an insulation material to be extruded or otherwise applied, maintaining a desired consistency of the insulation material, and/or increasing or enhancing the throughput of the extruder 110. As another example, one or more suitable melt pumps 140 may maintain a desired temperature of the insulation material as it is provided to the crosshead(s) 125.

In certain embodiments, one or more extrusion crosshead(s) 125 may receive insulation material formulated in the extruder 110. Any number of extrusion crossheads 125 may be utilized as desired. Each extrusion crosshead 125 may include any suitable components configured to apply the insulation material onto one or more wires 105. In certain embodiments, an extrusion crosshead 125 may apply insulation material onto a single wire 105. In other embodiments, a plurality of wires may be passed through one or more extrusion crossheads in tandem and insulation material may separately be applied to each wire. In yet other embodiments, a wire 105 may have a first insulation layer formed from a first insulation material applied by the extrusion crosshead 125 and a second insulation layer formed form a second insulation material (e.g., material formed in a separate extruder, etc.) applied by a second extrusion crosshead 125. In yet other embodiments, a wire may be passed through an extrusion crosshead assembly multiple times (e.g., passed through different portions of a crosshead assembly, etc.) in order to receive multiple layers of extruded insulation. Indeed, a wide variety of suitable extrusion crossheads and/or combinations of extrusion crossheads may be utilized as desired in various embodiments.

In other embodiments, an extrusion crosshead 125 may include co-extrusion capabilities that permit the extrusion of multiple layers of the same material or multiple layers formed from different materials (e.g., materials received from two different extruders, etc.). For example, an extrusion crosshead 125 may be capable of extruding multiple materials that are separately formulated in respective extruders. As another example, an extrusion crosshead 125 may be capable of extruding a first material formulated in the extruder 110 and a second material formulated in an offline process and subsequently provided for extrusion. A co-extrusion process may also be utilized to co-extrude a wide variety of different combinations of insulation layers. For example, a first layer of thermoset material and a second layer of thermoplastic material (e.g., a second layer formed around the first layer) may be co-extruded. As another example, two separate layers of one or a plurality of different thermoset materials may be co-extruded. As yet another example, two separate layers of one or a plurality of different thermoplastic materials may be co-extruded. As desired in certain embodiments, co-extruded layers may be simultaneously cured by one or more suitable curing systems and/or devices 175.

In certain embodiments, an extrusion crosshead 125 may include one or more extrusion, tips, dies, and/or other components that facilitate extrusion of the polymeric material. As desired, various component dimensions (e.g., tip and die sizes, etc.), land configurations (e.g., land lengths, land sizes, etc.), and/or other component parameters. (e.g., tip and/or die drool, torque, back pressure, etc.), configurations, or arrangements may be utilized within an extrusion crosshead 125 to provide a desired extrusion profile of the insulation material.

Additionally, a wide variety of suitable polymeric insulation materials may be extruded by an extrusion crosshead 125. In certain embodiments, an extrusion crosshead 125 may be configured to extrude a thermoplastic polymeric material, such as a melted thermoplastic material. In other embodiments, an extrusion crosshead 125 may be configured to paste extrude a thermoset polymeric material. For example, an extrusion crosshead 125 may be configured to extrude a thermoset polymeric material in a relatively low solvent form, such as a material having a solvent content below approximately 5, 7, 8, 10, 12, 15, 17, 18, 20, 22, 25, 27, 28, or 30% by weight, or a solvent content included in a range between any two of the above values. The extrusion crosshead 125 may extrude or apply the thermoset material as a relatively high-pressure semi-solid material or as a paste.

In certain embodiments, a desired build and/or thickness of an extruded thermoset insulation layer may be controlled during the extrusion process (e.g., via one or more suitable extrusion tip and die assemblies, etc.). The relatively low solvent convent (or lack of solvents) in the extruded material may permit a relatively heavy or thick build to be extruded as subsequent curing may effectively remove any solvents. For example, a thermoset material may be extruded with a thickness of approximately 0.02, 0.025, 0.03, 0.04, 0.05, 0.06, 0.075, 0.08, 0.10, 0.12, 0.125, 0.14, 0.15, 0.16, 0.175, 0.18, or 0.20 inches, a thickness included in a range between any two of the above values (e.g., a thickness between approximately 0.02 and approximately 0.20 inches, etc.), or a thickness included in a range bounded on either a minimum or maximum end by one of the above values. In certain embodiments, an insulation layer may be extruded with a desired thickness and/or build in a single pass. In other embodiments, a plurality of insulation layers (e.g., insulation layers formed from the same material or different materials, etc.) may be extruded in a plurality of operations by one or more suitable extrusion crossheads and/or systems.

Although FIG. 1 illustrates one or more extrusion crossheads 125, a wide variety of other suitable application systems, components, and/or devices may be utilized to apply a polymeric insulation material formulated within the extruder 110 onto one or more wires 105. For example, an insulation material formulated within the extruder 110 may be formulated as a liquid varnish including polymeric material suspended in one or more solvents. The varnish may be supplied to any number of suitable varnish application components, such as application dies, rollers, brushes, etc. Following application, the varnish may be cured (e.g., cured in an oven) to form an enamel layer and, as desired, successive enamel layers may be formed until a suitable build or thickness is attained.

With continued reference to FIG. 1, the wire line 104 may be configured to provide one or more wires 105 to the polymerization system 102 for application of the insulation material by the extrusion crosshead 125 or other application assemblies. The wire line 104 may include a wide variety of suitable components and/or devices. As shown, the wire line 104 may include a wire drawing device 165, one or more temperature control devices 170, and/or one or more curing systems 175. Each of these illustrated components, as well as alternative and/or additional components that may be incorporated into a wire line 104, is described in greater detail below.

In certain embodiments, a wire drawing device 165, rod mill, or rod breakdown machine may receive input material 167 (e.g., wire stock, a larger conductor, etc.) from a suitable source (e.g., a payoff, a reel, etc.) and draw the input material 167 through one or more dies in order to reduce the dimensions of the input material 167 to desired dimensions for the wire 105. As desired, one or more flatteners, rollers, and/or other suitable devices may be utilized to flatten one or more sides of the input material 167. In this regard, a rectangular wire or wire having another desired cross-sectional shape may be formed in certain embodiments. A wire drawing device 165 may include any number of suitable capstans or pulling devices that pull or draw the input material through the die(s), and any suitable motors may power the capstan(s).

In other embodiments, the wire 105 may be formed from input material 167 via a suitable continuous extrusion or conform machine. For example, a conform machine may receive input material 167 from a payoff or other source, and the conform machine may process and/or manipulate the input material to produce a desired wire conductor via extrusion. In yet other embodiments, a preformed wire 105 may be provided or received from a suitable payoff or other source. In other words, a wire 105 may be preformed in an offline process or obtained from an external supplier. Regardless of how the wire 105 is formed, a wide variety of other suitable devices may operate on the wire 105 prior to application of insulation material, such as an annealer and/or one or more wire cleaning devices.

The wire 105 may include a conductor formed from any suitable electrically conductive material, for example, copper, aluminum, annealed copper, oxygen-free copper, silver-plated copper, nickel plated copper, copper clad aluminum ("CCA"), silver, gold, a conductive alloy, a bimetal, carbon nanotubes, carbon polyimide composite materials, or any other suitable electrically conductive material or combination of materials. Additionally, the wire 105 may be formed with any suitable dimensions and/or cross-sectional shapes. For example, the wire 105 may have a circular, elliptical, rectangular, square, or other suitable cross-sectional shape. As desired for certain cross-sectional shapes, such as a rectangular cross-sectional shape, a wire 105 or conductor may have corners that are rounded, sharp, smoothed, curved, angled, truncated, or otherwise formed.

In certain embodiments, the wire 105 may be a bare wire that is provided to the application assembly (e.g., the extrusion crosshead 125). In other embodiments, the wire 105 may include any number of base layers of insulation. For example, rather than drawing or otherwise forming a wire from input material, an insulated wire may be provided from any suitable upstream devices or source devices (e.g., payoffs, etc.). As another example, a wire 105 may be passed through one or a plurality of upstream systems or devices in order to form one or more base layers of insulation prior to the wire 105 being provided to the extrusion crosshead 125 (or other application assembly). For example, an upstream extrusion crosshead may be utilized to form a base layer of extruded insulation material on the wire 105. As another example, one or more upstream devices (e.g., one or more application dies and/or curing ovens, etc.) may be utilized to form one or more base enamel layers on the wire 105. Examples of suitable base insulation include, but are not limited to, one or more extruded layers of insulation, one or more layers of enamel (e.g., polyimide, polyamideimide, amideimide, polyester, polyesterimide, polyamide, etc.), one or more layers of semi-conductive material, one or more tape or wrap layers, etc. Base insulation may include any suitable number of layers formed from a wide variety of suitable insulation materials. Additionally, base insulation may be formed with any suitable thickness, builds, concentricity, and/or other dimensions.

In certain embodiments, prior to application of insulation material on the wire 105, such as extrusion by the extrusion crosshead 125, a temperature of the wire 105 may be controlled and/or modified. In this regard, the insulation material may be applied to a wire 105 having a desired temperature or a temperature within a desired range. Temperature control may facilitate adhesion between the insulation material and the conductor (or base insulation) and, in certain embodiments, may permit avoidance of a separate adhesive layer. In other embodiments, an adhesive layer may be applied to the wire 105 prior to extrusion or other application of the insulation material. A wide variety of suitable temperature control device(s) 170 may be utilized as desired in various embodiments. In certain embodiments, the wire 105 may be passed through one or more heating devices, such as one or more induction heating devices, heating coils, heaters, ovens, and/or any other suitable devices configured to increase or raise the temperature of the wire 105. In other embodiments, one or more cooling devices may be utilized as temperature control devices 170. The temperature of the wire 105 may be adjusted or controlled to achieve a wide variety of suitable values prior to extrusion or other application of the insulation material. For example, in certain embodiments, the temperature may be controlled to approximately 150° C., 175° C., 200° C., 225° C., 250° C., a temperature included in a range between any two of the above values, or a temperature included in a range bounded on either a minimum or maximum end by one of the above values (e.g., greater than 200° C., etc.).

In certain embodiments, following extrusion or other application of the insulation material by an application assembly (e.g., an extrusion crosshead 125), the insulation may be cured by any number of suitable curing systems 175 and/or curing devices. The curing may provide a wide variety of desirable benefits, for example, chemical cross-linking, enhancing heat resistance, heat shock, and/or other temperature performance parameters, enhancing chemical resistance, and/or enhancing abrasion resistance. A wide variety of suitable curing systems 175 and/or devices may be utilized as desired in various embodiments. Example curing systems 175 include, but are not limited to, radiation curing devices, electron beam curing ("EBC") devices, variable frequency microwave ("VFM") curing devices, ultraviolet ("UV") curing devices, and/or ovens (e.g., an enameling oven, etc.). Any number of curing devices and/or combinations of curing devices may be utilized as desired in various embodiments.

Additionally, as desired, the temperature of the wire 105 and applied insulation may be controlled following application of the insulation and/or curing the insulation. For example, the insulation may be heated following extrusion or other application. For extruded insulation, heating may maintain a desired post-extrusion temperature and/or assist in attaining a desired crystallinity. Additionally, in certain embodiments, the process of cooling the extruded insulation prior to taking up the finished magnet wire or providing the wire 105 to one or more downstream systems may be controlled. As a result of controlling the cooling rate of the extruded insulation, any number of desirable characteristics may be achieved, such as achieving a desired crystallinity. A wide variety of suitable devices may be utilized as desired to cool the wire 105, such as a liquid (e.g., water, etc.) bath.

Following curing of the insulation material, the wire 105 may be provided to any number of suitable components and/or systems configured to perform additional processing. In certain embodiments, the wire 105 may be taken up or spooled for distribution or subsequent processing (i.e., subsequent processing performed in a offline manner, etc.). In other embodiments, the wire 105 may be provided to any number of suitable downstream devices configured to form additional insulation layers (e.g., an extruded layer, a bondcoat, a conformal layer, etc.). For example, the wire 105 may be fed back to the extrusion crosshead(s) 125 in order to form another extruded insulation layer. As another example, the wire 105 may be provided to a downstream system configured to form an additional insulation layer, such as an extruded layer formed from a different set of one or more insulating materials. As yet another example, the wire 105 may be provided to one or more systems configured to form one or more conformal coatings on the wire 105, such as one or more coatings containing parylene. In yet other embodiments, the wire 105 may be provided to one or more suitable cutting and/or shaping systems configured to form any number of suitable hairpins, coils, shaped articles, and/or other assemblies from the wire 105 that are suitable for incorporation into an electric machine or other application. In yet other embodiments, the wire 105 may be provided to one or more suitable systems configured to use additive manufacturing or 3-D printing to form magnets (e.g., rare earth magnets, etc.) on the extruded insulation. Indeed, a wide variety of suitable operations and/or additional processing may be conducted on the wire 105. As desired, additional processing may be conducted in an inline or offline manner.

The system 100 described above with reference to FIG. 1 is provided by way of example only. A wide variety of alternatives could be made to the system 100 as desired in various embodiments. Further, a wide variety of additional components may be incorporated into the system 100 as desired. As desired, the system 100 may also include any number of controllers or control devices, such as computers, microcontrollers, application specific circuit interfaces, programmable logic arrays, or other control devices that facilitate synchronization and/or configuration of any number of suitable system components. Indeed, the present disclosure envisions a wide variety of suitable systems that may be utilized to form magnet wire insulation.

FIG. 2 depicts a schematic diagram of another example system 200 that may be utilized to formulate and apply polymeric insulation material onto magnet wire in a tandem or inline manner, according to an illustrative embodiment of the disclosure. The system 200 may include components that are similar to those described above with reference to the system 100 of FIG. 1. For example, the system 200 may include a polymerization system 202 that operates in tandem with a wire line 204. The polymerization system 202 may include an extruder 210 powered by one or more motor assemblies 215. The extruder 210 may receive a plurality of ingredients for a polymeric insulation material from one or more suitable feeder assemblies 220A, 220B, and the ingredients may be processed by the extruder 210 in order to form the polymeric insulation material. The insulation material may then be provided to one or more suitable application assemblies for application onto a wire 205, such as one or more extrusion crossheads 225. As desired, one or more vacuum devolatilization devices 230, filtering devices 235, gear pumps 237, melt pumps 240, and/or other suitable devices may be utilized to further process the polymeric insulation material prior to application. Additionally, any number of suitable downstream feeder assemblies 245 may be utilized to add additional components to the polymeric material.

In contrast to the system 100 shown in FIG. 1, the system 200 of FIG. 2 explicitly depicts two feeder assemblies 220A, 220B that are longitudinally spaced from one another along a length of the extruder 210. A first feeder assembly 220A may provide material to the extruder 210 at a first location along a longitudinal length of the extruder 210, and a second feeder assembly 220B may provide material to the extruder 210 at a second location along the longitudinal length of the extruder 210 that is offset downstream from the first location. In this regard, ingredients may be provided at desired locations corresponding to respective stages or phases of a polymerization or other insulation material formulation process. As desired, any number of feeder assemblies may be positioned various locations along a longitudinal length of the extruder 210.

Similar to the system 100 of FIG. 1, the wire line 204 may be configured to provide one or more wires 205 to the polymerization system 202 for application of the insulation material by the extrusion crosshead 225 or other application assemblies. The wire line 204 may include a wide variety of suitable components and/or devices. As shown, the wire line 104 may include a wire drawing device 265, one or more temperature control devices 270, and/or one or more curing systems 275. Each of these components may be similar to those discussed above with reference to FIG. 1. In certain embodiments, an oven may be utilized as a curing system 275. An oven may be utilized to heat cure an applied insulation material. For example, if a thermoset polymeric material is formulated within the extruder 210 and paste extruded (e.g., extruded in a relatively low solvent form, etc.) onto the wire 205, an oven may be utilized to beat cure the applied thermoset material and bake off the solvent from the thermoset material. As desired, other curing systems may be substituted for the illustrated oven. For example, radiation curing devices, electron beam curing ("EBC") devices, variable frequency microwave ("VFM") curing devices, ultraviolet ("UV") curing devices, and/or other curing devices may be utilized as desired.

Figure 3:
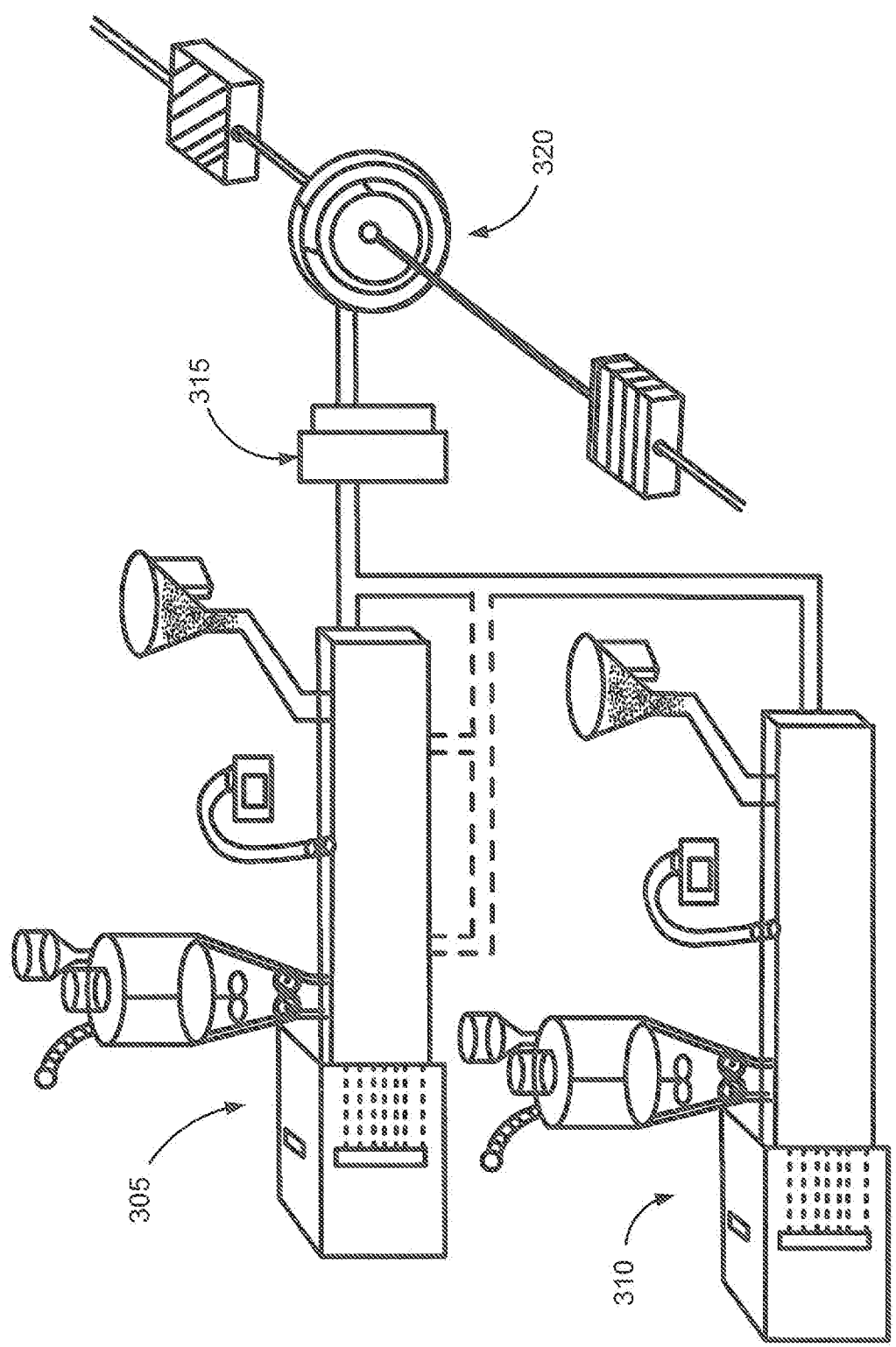
FIG. 3 depicts a schematic diagram of an example system that may be utilized to formulate and apply a blended polymeric insulation material onto magnet wire in a tandem or inline manner, according to an illustrative embodiment of the disclosure.

FIG. 3 depicts a schematic diagram of an example system 300 that may be utilized to formulate and apply a blended or composite polymeric insulation material onto magnet wire in a tandem or inline manner, according to an illustrative embodiment of the disclosure. As shown, the system 300 may include a plurality of suitable extruders 305, 310. Each extruder 305, 310 may be similar to the extruders 110, 210 described in greater detail above with reference to FIGS. 1 and 2. Additionally, each extruder 305, 310 may be configured to formulate a respective polymeric material. For example, a first extruder 305 may receive ingredients for a first polymeric material, and the first polymeric material may be polymerized and formulated within the first extruder 305. A second extruder 310 may receive ingredients for a second polymeric material, and the second polymeric material may be polymerized and formulated within the second extruder 310. As desired, additional extruders may be utilized to formulate additional polymeric materials.

Once two or more desired polymeric materials have been formulated in the extruders 305, 310, a blend, composite, or other combination of the two or more polymeric materials may be formed. In certain embodiments, the combination may be formed within one of the extruders. For example, the second polymeric material formed in the second extruder 310 may be supplied to the first extruder 305, and the two polymeric materials may be mixed, blended, or otherwise together within the first extruder 305. In other embodiments, two or more polymeric materials may be combined in a separate device or component, such as a separate mixing tank. For example, two or more polymeric materials may be formulated within two or more respective extruders, and the polymeric materials may be supplied to a mixing tank for combination. Once a polymeric blend or other combination has been formed, the material may be supplied to one or more suitable application assemblies for application onto magnet wire. For example, a suitable gear and/or melt pump assemblies 315 may pump the polymeric material to one or more extrusion crossheads 320 for application onto one or more magnet wires.

As an alternative to utilizing a plurality of extruders to formulate two or more polymeric materials for blending or combination, in other embodiments, a first polymeric material may be formulated in an extruder 305 while a second polymeric material to be combined with the first material is formed in an offline process and subsequently provided for combination. For example, the second polymeric material may be provided to the extruder 305 or to a separate mixing tank for combination with the first polymeric material. Any suitable polymeric blends, composites, and/or combinations may be formulated and/or utilized as desired in various embodiments of the disclosure, such as combinations of any of the polymeric materials discussed above. Additionally, any suitable blending rates, mixing rates, or blending ratios may be utilized when two or more polymeric materials are combined together.

The systems 200, 300 described above with reference to FIGS. 2 and 3 are provided by way of example only. A wide variety of alternatives could be made to the systems 200, 300 as desired in various embodiments. Further, a wide variety of additional components may be incorporated into a system 200, 300 as desired. Further, various components described above with reference to FIGS. 1-3 may be selectively combined in order to provide a desired system that formulates and applies insulation onto magnet wire. Indeed, the present disclosure envisions a wide variety of suitable systems that may be utilized to form magnet wire insulation.

Figure 4:
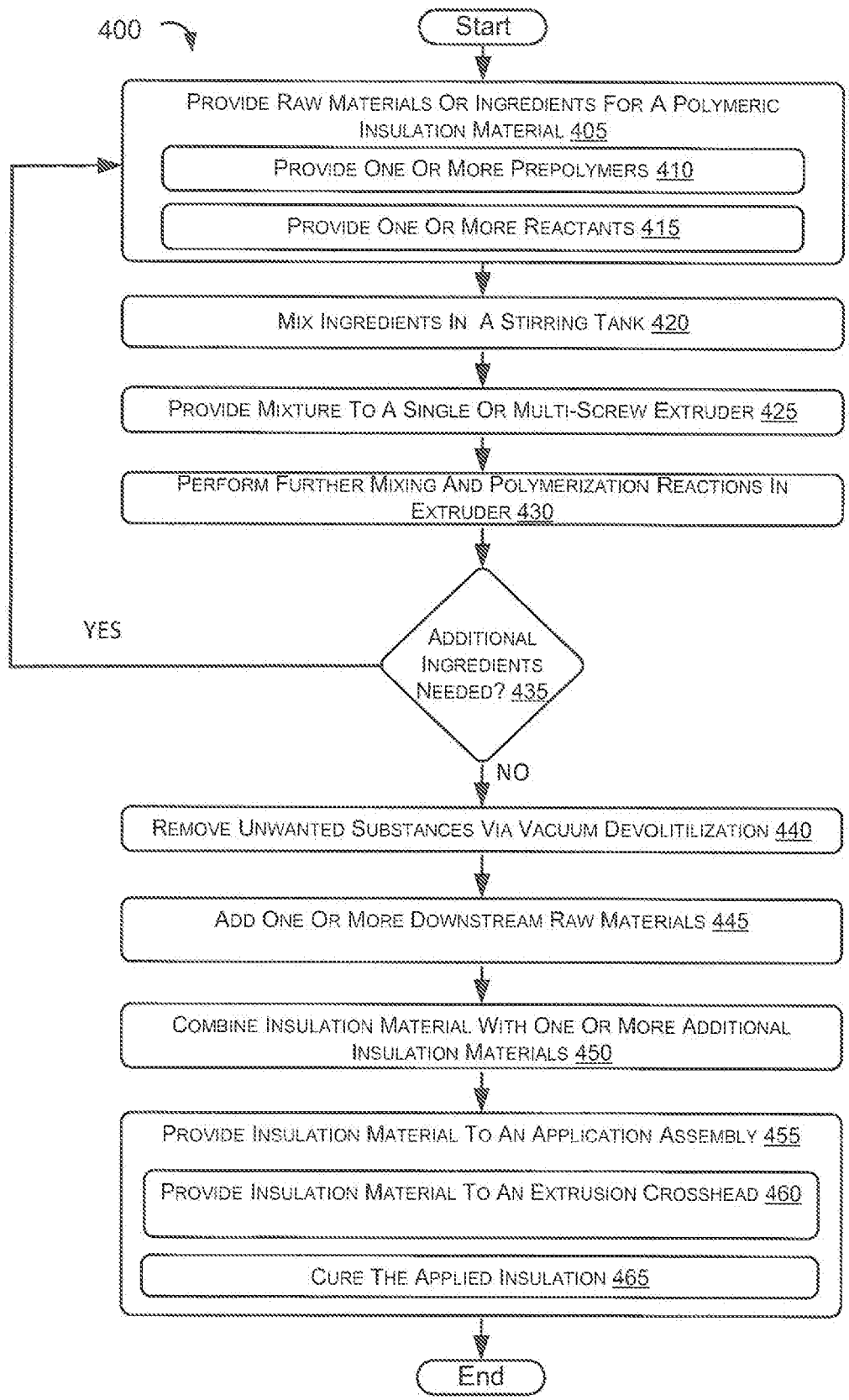
FIG. 4 illustrates a flow chart of an example method for formulating and applying a polymeric insulation material on magnet wire, according to an illustrative embodiment of the disclosure.

FIG. 4 illustrates a flow chart of an example method 400 for formulating a polymeric material and applying the polymeric material as insulation on magnet wire, according to an illustrative embodiment of the disclosure. The method 400 may be carried out by any suitable processing and application system, such as any of the systems 100, 200, 300 described above with reference to FIGS. 1-3. The method 400 may begin at block 405. At block 405, a plurality of ingredients and/or raw materials for a polymeric insulation material may be provided. A wide variety of suitable ingredients may be provided as desired in various embodiments. For example, at block 410, one or more monomers and/or pre-polymers may be provided. As another example, at block 415, one or more reactants may be provided. As desired, powders, solid materials, and/or other ingredients may be provided. The ingredients may be provided via any number of suitable devices, such as one or more suitable hoppers and/or feeding assemblies.

At block 420, the provided ingredients may optionally be stirred, blended, or otherwise mixed together in a suitable stirring tank or other suitable mixing device. The mixture may then be provided to a suitable extruder, such as a single or multi-screw extruder, at block 425. At block 430, the extruder may facilitate further mixing as it processing the ingredients. Additionally, the extruder may facilitate the onset and/or completion of a wide variety of chemical reactions between the ingredients. For example, the extruder may increase the temperature and/or pressure of the ingredients, thereby facilitating one or more polymerization and/or other reactions between the plurality of ingredients in order to form a desired polymeric insulation material within the extruder.

At block 430, a determination may be made as to whether additional ingredients for the polymeric insulation material are desired or needed. If it is determined at block 430 that additional ingredients are desired, then operations may continue at block 405, and one or more additional ingredients may be provided. For example, additional ingredients for the polymeric insulation material may be provided to the extruder by a feeder assembly that is situated longitudinally downstream from one or more feeder assemblies that have previously provided ingredients to the extruder. In this regard, respective ingredients may be provided to the extruder at various desired positions or locations within a polymerization process.

If, however, it is determined at block 435 that no additional ingredients are desired, then operations may continue at block 440. At block 440, a wide variety of unwanted substances may be removed from the insulation material via one or more suitable vacuum devolatilization and/or other suitable devices. For example, water, solvents, other liquids, and/or other unwanted materials may be removed as the insulation material is processed within the extruder. Similarly, unwanted materials may be removed at locations situated between various feeder assemblies.

At block 445, which may be optional in certain embodiments, one or more downstream raw materials may be added to the extruder. For example, one or more filler materials, materials that will not melt during extrusion of an insulation material, and/or one or more materials to be added following polymerization and/or devolatilization, may be added to the extruder as downstream materials. At block 450, the insulation material may be combined, blended, or mixed with one or more additional polymeric materials (e.g., preformed polymeric materials, polymeric materials formulated in other extruders, etc.). In certain embodiments, two or more polymeric insulation materials may be blended within the extruder. In other embodiments, two or more polymeric insulation materials may be blended in a separate component, such as a mixing tank.

At block 455, the insulation material may be provided to one or more suitable application assemblies for application onto one or more magnet wires. A wide variety of suitable application assemblies may be utilized as desired in various embodiments. For example, at block 460, one or more extrusion crossheads may extrude the insulation material onto one or more magnet wires. In certain embodiments, a thermoplastic material may be extruded onto one or more magnet wires. In other embodiments, a thermoset material may be paste extruded onto one or more magnet wires. As another example, at block 365, one or more application dies, brushers, rollers, or other suitable components may apply the insulation material onto one or more magnet wires. For example, a thermoset material may be applied as a varnish.

As desired, an insulation material may be processed by any number of suitable filtering devices prior to application onto one or more magnet wires. Additionally, once the insulation material has been applied onto the wire, the insulation material may be cured at block 470. A wide variety of suitable devices, systems, and/or techniques may be utilized in order to cure the applied insulation material. For example, insulation material may be cured via radiation curing devices, electron beam curing ("EBC") devices, variable frequency microwave ("VFM") curing devices, and/or ultraviolet ("UV") curing devices. As another example, thermoset insulation material may be cured by one or more suitable ovens or other heat curing devices.

In certain embodiments, the method may end following block 470. For example, the magnet wire may be taken up following curing of the insulation material. In other embodiments, a wide variety of additional processing may be performed on the wire prior to the method's 400 completion. In certain embodiments, one or more additional layers of insulation may be formed on the wire. For example, one or more additional insulation layers may be extruded onto one or more magnet wires. As another example, one or more conformal layers may be formed. As yet another example, one or more magnet wires may be cut and/or formed into any desired number of assemblies.

The operations described and shown in the method 400 of FIG. 4 may be carried out or performed in any suitable order as desired in various embodiments. Additionally, in certain embodiments, at least a portion of the operations may be carried out in parallel. Furthermore, in certain embodiments, less than or more than the operations described in FIG. 4 may be performed.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for forming insulation on magnet wire, the system comprising:
    an extruder comprising one or more rotating screws, wherein the extruder is adapted to receive plurality of ingredients for a thermoset polymeric insulation material and process the plurality of ingredients to facilitate polymerization of the thermoset polymeric insulation material within the extruder, the plurality of ingredients comprising (i) a monomer or a pre-polymer and (ii) a reactant;
    an application assembly in fluid communication with the extruder and adapted to apply the thermoset polymeric insulation material onto a wire; and
    a curing device configured to cure the thermoset polymeric insulation material following its application onto the wire, the curing device comprising at least one of (i) an oven, (ii) an infrared light curing device, (iii) an ultraviolet light curing device, (iv) a radiation curing device, (v) an electron beam curing device, or (vi) a variable frequency microwave curing device.

2. The system of claim 1, further comprising:
    one or more feeder assemblies configured to supply the plurality of ingredients to the extruder.

3. The system of claim 2, wherein the one or more feeder assemblies comprise a first feeder assembly configured to provide a first portion of the plurality of ingredients to the extruder at a first location and a second feeder assembly configured to provide a second portion of the plurality of ingredients to the extruder at a second location downstream from the first location.

4. The system of claim 3, wherein the second feeder assembly includes at least one screw configured to apply pressure to the second portion of the plurality of ingredients in order to reduce leakage from the extruder.

5. The system of claim 1, further comprising:
a vacuum devolatilization device configured to remove unwanted materials from the extruder.

6. The system of claim 1, wherein the application assembly comprises an extrusion crosshead assembly.

7. The system of claim 1, wherein the extruder comprises a first extruder that receives a first plurality of ingredients for a first polymeric insulation material, and further comprising:
a second extruder configured to receive a second plurality of ingredients for a second polymeric insulation material and process the plurality of ingredients to facilitate polymerization of the second polymeric insulation material,
wherein the first and second polymeric insulation materials are combined prior to being supplied to the application assembly.

8. A system for forming insulation on magnet wire, the system comprising:
one or more feeder assemblies adapted to supply a plurality of ingredients for a thermoset polymeric insulation material, the plurality of ingredients comprising (i) a monomer or a pre-polymer and (ii) a reactant;
an extruder comprising one or more rotating screws, wherein the extruder is adapted to receive the plurality of ingredients from the one or more feeder assemblies and process the plurality of ingredients to facilitate polymerization of the thermoset polymeric insulation material within the extruder; and
an application assembly in fluid communication with the extruder and configured to apply the thermoset polymeric insulation material onto a wire in a form containing less than thirty percent solvent by weight; and
a curing device adapted to cure the thermoset polymeric insulation material and remove solvent from the thermoset polymeric insulation material.

9. The system of claim 8, wherein the one or more feeder assemblies comprise a first feeder assembly configured to provide a first portion of the plurality of ingredients to the extruder at a first location and a second feeder assembly configured to provide a second portion of the plurality of ingredients to the extruder at a second location downstream from the first location.

10. The system of claim 9, wherein the second feeder assembly includes at least one screw configured to apply pressure to the second portion of the plurality of ingredients in order to reduce leakage from the extruder.

11. The system of claim 8, further comprising:
a vacuum devolatilization device configured to remove unwanted materials from the extruder.

12. The system of claim 8, wherein the application assembly comprises an extrusion crosshead assembly.

13. The system of claim 8, wherein the curing device comprises one of (i) an infrared light curing device, (ii) an ultraviolet light curing device, (iii) a radiation curing device, (iv) an electron beam curing device, or (v) a variable frequency microwave curing device.

14. The system of claim 8, wherein the curing device comprises an oven.

15. The system of claim 8, wherein the extruder comprises a first extruder that receives a first plurality of ingredients for a first polymeric insulation material, and further comprising:
a second extruder configured to receive a second plurality of ingredients for a second polymeric insulation material and process the plurality of ingredients to facilitate polymerization of the second polymeric insulation material,
wherein the first and second polymeric insulation materials are combined prior to being supplied to the application assembly.

* * * * *